July 27, 1965 W. B. CONNER 3,196,732
TONALINGUA CHORDMASTER SET
Filed June 18, 1962 3 Sheets-Sheet 2
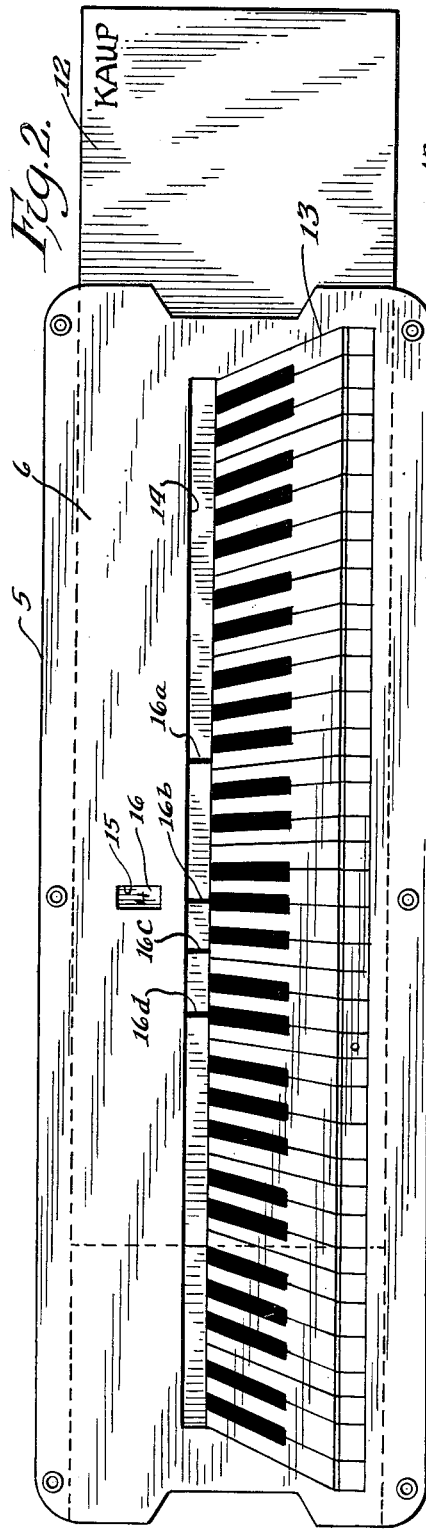
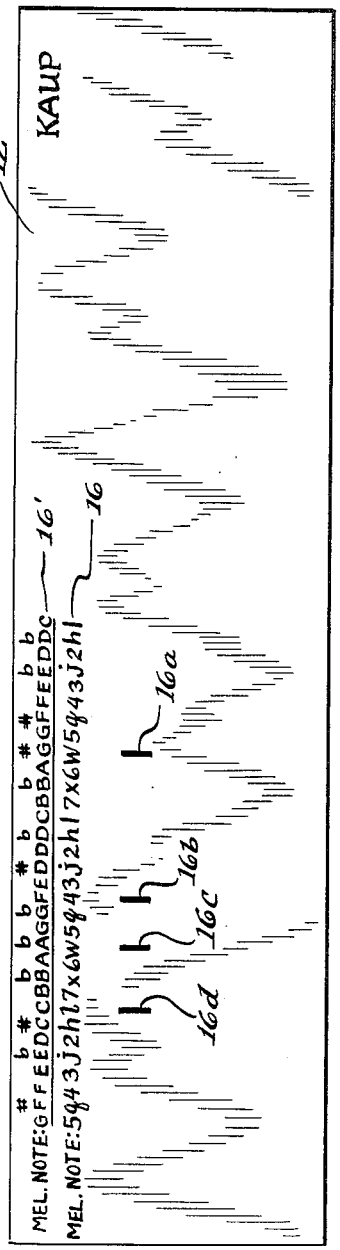
Inventor
William B. Conner

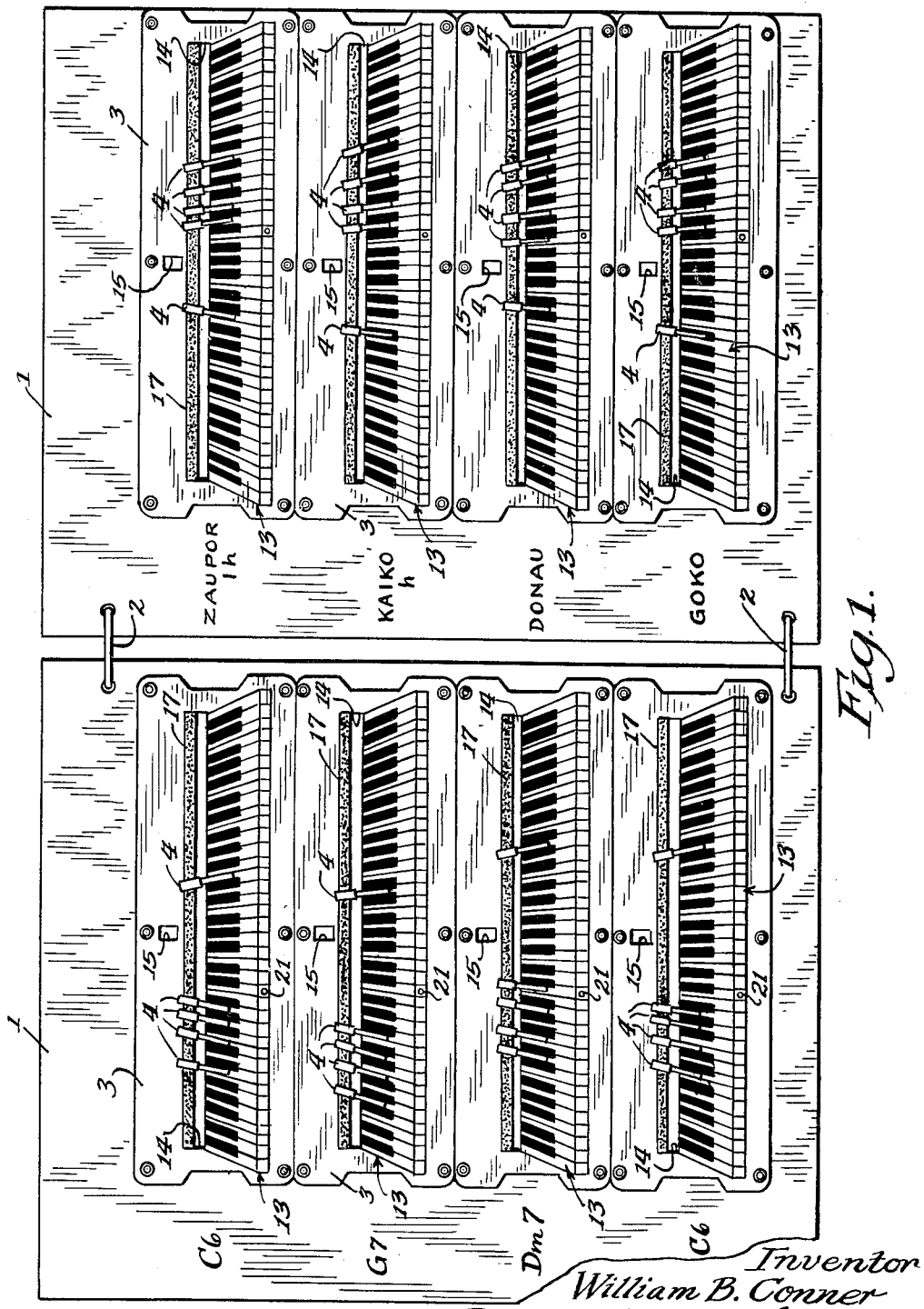

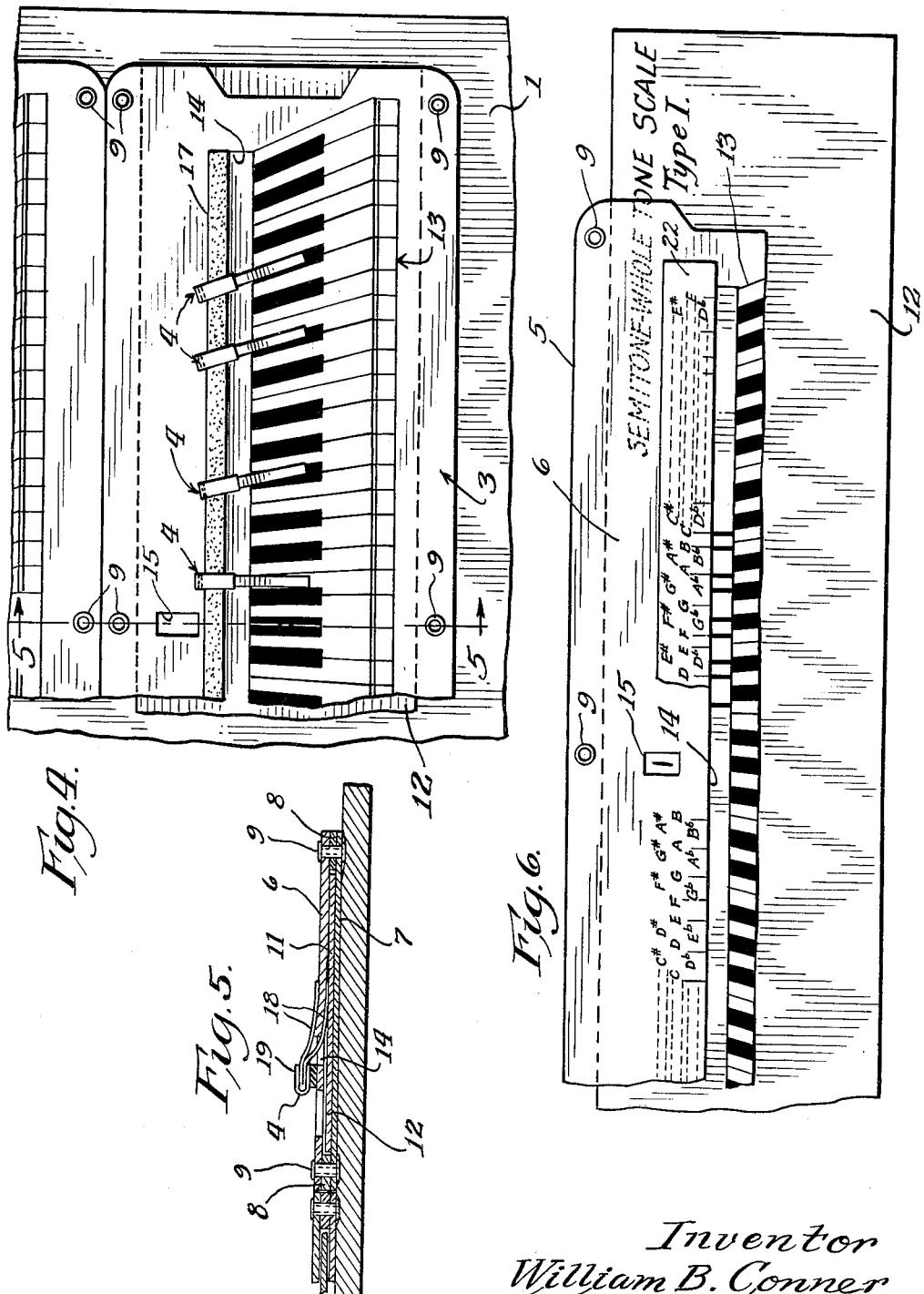

3,196,732
TONALINGUA CHORDMASTER SET
William B. Conner, P.O. Box 161, St. Cloud, Minn.
Filed June 18, 1962, Ser. No. 203,208
28 Claims. (Cl. 84—478)

The invention relates generally to the field of music and more particularly to a system and apparatus for effecting musical chord composition and identification, and association thereof, as well as musical scale, with the chromatic scale as, for example, the keyboard of piano.

The present invention is of particular advantage and application to a novel system which I have developed for designating and identifying musical chords, the system employing fundamental or inherent chord characteristics rather than arbitrary definitions, identifications, etc. Thus, in this system, which I have titled "Tonalingua," the chords are defined by the inherent relation of the various notes of the chord with respect to each other, namely, the tonal interval between the individual notes as well as the relation of the chord to the desired melody note with which the chord is to be featured, the latter relationship likewise being expressed in tone intervals. "Tonalingua" features a novel system of notations whereby the chords may be identified and actually given a chord designation or name which is so expressed phonetically that the chord as well as the associated melody note may be phonetically expressed and readily identified in terms of tone intervals existing between the notes of the chord and relationship to the melody note.

The "Tonalingua" system is described in detail in my book entitled "Tonaligua and the Inner Harp" published in 1957 and copyrighted in that year. In view of the particular applicability of the present invention to such a system, a brief description thereof, insofar as its application to the present invention, will be given.

In the "Tonalingua" system, which will be discussed for the purposes of explanation, with a chromatic scale such as a piano keyboard, the notes of the diatonic scale are given numbers and the additional notes of the chromatic scale are represented by letters. In other words, with respect to a piano keyboard the white keys are designated by numbers and the black keys by letters. For example, the keys representing C, D, E, F, G, A and B are respectively identified by the numbers 1, 2, 3, 4, 5, 6 and 7. In like manner, the keys representing C sharp, E flat, D sharp, E flat, F sharp, G flat, G sharp, A flat, and A sharp, B flat, are designated respectively by the letters $h, j, q, w$ and $x$.

The "Tonalingua" harmony notation is in actuality quite simple, consisting primarily of two basic elements: (a) a bass location letter and (b) vowels and consonants that stand for the two or more intervals constituting a chord. The bass letters, which comprise letters other than those used to identify individual notes begin the word identifying the chord and, except for bass harmonizations, are used in capitalized form. In my system, twelve such letters are used and indicate where the bass note is in relation to the melody note. One letter identifies the note which constitutes the lowest note of the chord as being the same as that of the melody note, regardless of how many octaves it lies below the melody note. Other letters respectively identify the bass note as being a half step below the melody note, a whole step, a minor third, major third, fourth, tritone, or sixth below the melody note, as well as a minor third above the melody note, a whole step or a half step above the melody note.

In similar manner, vowels, diphthongs and consonants, other than the first bass location consonant, are employed to indicate the interval between the melody note and next lower note. For example, "ea" indicates a minor second "or" indicates a major second. In like manner, the various other intervals are similarly identified, and by employing additional consonants the interval between the next lower note is similarly identified. The combined words so formed may then be identified with respect to the melody note by designating the numbered or lettered key of the keyboard which would precede the chord notation. Thus, to identify a chord and its melody note, the complete designation includes a numeral followed by a hyphen, a capital letter, and one or more vowels, diphthongs and additional consonants.

In other words, the "Tonaligua" notation is capable of spelling out the entire chord in the form of a word, as well as identifying the melody note, the identifying vowels, diphthongs and consonants being so selected that the resulting word may be readily identified phonetically as well as visually.

The present invention is of particular application to the "Tonalingue" system in that it enables a person to readily create a guide to the exact notes, or in the case of a piano keyboard, the exact keys to depress for any desired chord and melody note to be associated therewith. The invention, however, is also of similar value in connection with the translation of scales as well as chords utilizing standard notation, to a chromatic scale, as for example, a piano keyboard.

The present invention, therefore, has among its objects the utilization of a novel method and production of novel apparatus which may be suitably adjusted, for either "Tonalingua" or standard notation, to indicate the notes to be played with a particular melodic scale, or a melody note and associated chord arrangement.

A further object of the invention is the production of a novel means whereby a series of chords, as for example, those employed in a complete melody or song, may be visually reproduced, if desired, for direct replay therefrom on a musical instrument (the invention being herein described in connection with a piano keyboard), such chords being initially set up either by means of a master display structure or by direct setting of the individual chord displays.

Another object of the invention is the production of a novel multiple display structure which may be in book-like form comprising a plurality of leaves, each of which is adapted to display a plurality of individual melody notes and the chords to be associated therewith.

A further object of the invention is the production of a novel master display structure which may be cooperable with any one of a plurality of indicating members, each of which may represent a melody note and its associated chord whereby a set of indicating members may be produced which include all or a selected number of various chord and melody note arrangements.

A further object of the invention is the production of such a display structure which readily adapts itself to the "Tonalingua" system and may, for example, include an individual indicating member for each basic chord combination in the "Tonalingua" system, thereby providing a ready means of identifying to the student the various chord combinations, etc. and forming a valuable tool in connection with such system.

Many other objects and advantages of the invention will be apparent to those skilled in the art from the disclosure herein given.

In the drawings, wherein like reference characters indicate like or corresponding parts:

FIG. 1 is a plan view of a chord display book embodying the present invention;

FIG. 2 is a plan view of a master display structure for illustrating a chord and its melody note;

FIG. 3 is a plan view of the indicating member illustrated in FIG. 2;

FIG. 4 is an enlarged portion of one of the chord display structures illustrated in FIG. 1;

FIG. 5 is a sectional view taken approximately on the line 5—5 of FIG. 4; and

FIG. 6 is a plan view similar to FIG. 2 of an indicating member illustrating the application of the invention to the indication of scales as distinguished from chords.

The present invention involves a novel method of designating and identifying notes associated with musical chords or scales with respect to a chromatic arrangement of musical notes, as for example, a piano keyboard, designating the notes to be identified in terms of chromatic tone intervals therebetween and associating a selected note representation with a selected desired note of the chromatic arrangement and designating, from the representation, the remaining notes of the arrangement corresponding to the remaining selected notes. By means of the invention it is possible to provide a structure, which may be in the form of a book or the like, whereby a plurality of chords may be suitably illustrated for association with a chromatic representation or arrangement enabling identification of the selected notes on the arrangement or an equivalent piano keyboard or the like, novel master selecting means being also provided for facilitating the adjustment or setting of the book structure.

The master display structure may employ a single member or element which indicates or designates the notes or keys to be employed in the particular chord or scale selected, while the indicating means employed with the multiple book structure may comprise similar indicating means or preferably individual note indicating means which will provide a very pronounced and well defined indication of the note or key involved.

To facilitate an understanding of the basic differences between the standard chord notations and those of "Tonalingua" a very brief comparison between the two may be made. It will be initially appreciated that in connection with the standard chord designations numerous duplications exist as well as various inversions of the same basic chord. For example, an identical chord may be designated as either C sharp or D flat, F sharp or G flat, G sharp or A flat, and A sharp or B flat. In addition, the chord may involve a tonic position, a first inversion or a second inversion, etc. Similarly, the chord may be tonic, major, minor, augmented or diminished. The ability to transpose, harmonize and readily identify various chords on a piano keyboard or the like obviously, in the case of standard procedure, involves knowledge and skill and is therefore almost invariably left only to those of advanced training and ability. Likewise, even in the case of skilled persons, transposing and arranging is a complex procedure.

In contrast, in the "Tonalingua" system and method of notation, the major identifying factor or characteristic employed is the tone intervals between the various notes of a chord and between the latter and the melody note. Each chord, as determined by the intervals between its notes, is given a designation or name, the name being a key to the chord, the system being such that the phonetic and visual character of the name will form a guide to the chord structure, and one seeing the designated name or hearing the phonetic pronounciation thereof could readily determine therefrom the physical structure of the chord in terms of tone intervals between the notes thereof. In like manner the specific melody note associated with the chord may be designated to establish the exact position of the chord and melody note on the keyboard, disregarding the specific octave involved. Every different chord may thus have a single and individually identifying name, the sound or appearance of which is a self-contained key to the structure of the chord itself and the melody note associated therewith.

CONSTRUCTION

Referring to the drawings and more particularly to FIGS. 1 through 3, FIG. 1 illustrates two leaves of a book of the loose-leaf type, the leaves 1 being joined by suitable means such as a pair of rings 2 extending through holes in the respective leaves. Each leaf is illustrated as being provided with a plurality of representations of a diatonic series of musical indicia which, in the embodiment of the inventon illustrated, is represented as a piano keyboard. Also in the embodiment illustrated, each representation is formed as a unit, hereinafter referred to as "keyboard adapter," indicated generally by the numeral 3. While each page is illustrated as embodying four keyboard adapters, any suitable number of adapters may be employed on the leaves depending upon the relative proportions of the leaf and the respective adapters. As illustrated in detail in FIGS. 4 and 5, cooperable with each of the keyboard adapters 3 are a plurality of indicating members 4 by means of which various notes on the keyboard representations may be indicated.

Cooperable with the keyboard adapters is an instruction adapter 5, the details of which are illustrated in FIGS. 2 and 3, the instruction adapter being generally similar in construction to the keyboard adapters illustrated in FIG. 1 and adapted to be suitably manipulated to provide an indication by means of which the various adapters in the book may be adjusted or set.

The adapter book, for example, in the preferred form may consist of six panels or pages which conveniently may be approximately fifteen inches high and twelve inches wide, each panel containing four or five keyboard adapters. In one form of the invention which has proved very efficient, fifty-four keyboard adapters are employed, each of the six panels or pages containing five keyboard adapters on the verso side and four on the recto side, the total of fifty-four adapters being adequate for most musical compositions, as relatively few refrains of popular songs contain over fifty chords.

Each keyboard adapter 3, as well as the instruction adapter 5, is illustrated as being of similar construction and, as illustrated in FIGS. 2, 4 and 5, comprises a top member or sheet 6, a bottom member or sheet 7, which are disposed in spaced relation by a pair of longitudinally extending substanially parallel spacer strips 8 interposed between the members 6 and 7, the structure thus formed being secured in assembled relation by suitable means, as for example, a plurality of rivets 9, six of which are employed in the particular adapters illustrated.

The assembled members 6, 7 and 8 thus form a body structure having a channel or slot 11 formed therein into which may be inserted an instruction card 12, preferably dimensioned to permit sliding movement of the card within the slot 11, the strips 8 preventing lateral shifting of the card relative to the adapter body transversely to the longitudinal dimensions of the elements.

Each adapter 3 and the adapter 5 preferably contain like representations, indicated generally by the numeral 13, of a standard piano keyboard of sixty-four notes.

The sheet 6 of each adapter may be provided with longitudinally extending slot 14 therein which is disposed adjacent the upper edge of the keyboard representation 13 and of corresponding length, and as illustrated in FIG. 2, the instruction adapter 5 may be provided with a window opening 15 therein. While the keyboard adapters will normally not contain an opening 15, if desired, such adapters also may be provided with such an opening as illustrated in FIGS. 1 and 4.

As will be apparent from a reference to FIGS. 2 and 3, the card 12 may be provided with a series of indicia marks, such as the vertically extending lines 16a, 16b, 16c and 16d, disposed on the card for viewing through the slot 14 when the card 12 is inserted in the instruction adapter 5, as illustrated in FIG. 2. The card 12 preferably also contains a series of identifying letters and numbers arranged in a line, designated in FIG. 3 by the heading "Melody Note," the indicia 16 being disposed on the card 12 in alignment with the window 15 of the instruction adapter. The letters and numbers appearing in the window thus identify the melody note, in the example illustrated, in tonalinqua form, and as the card 12 is moved relative to the adapter body the indicia in the window 15 will successively indicate the melody note for which the card 12 is at that time positioned and simultaneously therewith will locate the corresponding keys for the particular chord represented on the card.

The keyboard adapters 3, as illustrated in FIGS. 4 and 5, are suitably constructed to receive markers such as the markers 4, the particular embodiment of the invention employing a suitable strip 17 of a magnetic material which is cooperable with metal portions of the markers 4 to provide a retaining force between the markers and the adapter. Each marker 4 is provided with a pair of coextending leg portions 18 formed from suitable material, as for example, plastic, celluloid or the like, the leg portions, if desired, being formed from a single elongated strip of material folded back upon itself and secured in operative position by suitable means such as a U-shaped metal clip 19 which is crimped or clamped on the adjacent end of the marker and adapted to be attracted to the magnetic strip 17 to provide a retentive force on the marker. As clearly illustrated in FIG. 4, the marker may be applied to the adapter by inserting one of the legs 18 through the slot 14 and into the slot 11 formed by the top and bottom members 6 and 7, the opposite leg of the marker being disposed on the top surface of the member 6. The leg portions 18 of each marker preferably are of a color that will provide a sharp contrast between the keys represented on the keyboard representation. For example, a relatively bright red is readily distinguishable on both the black and white keys of the keyboard representation and markers of this color have proved to be very effective.

OPERATION

In use, the function of the chord adapter book is to provide a keyboard representation for each chord in a melody to be played, whereby the user, by following the keyboard representations, may readily identify and play the desired chords. Thus the fifty four adapters normally contained in the chord book would be adequate to enable setting up of all the chords of a particular melody, the great majority of which do not contain fifty-four chords. At the same time the leaves of the chord book are preferably so constructed that the user may place other desired information with respect to the chords, melody, etc., as for example, such as appearing in FIG. 1, the left hand leaf designating the respective chord in standard notation and the right hand leaf designating the chords in "Tonalinqua" notation.

A complete set will normally comprise the chord book containing fifty-four keyboard adapters, one instruction adapter 5 and a complete set of cards 12, representing the various chords in terms of note intervals between the notes of the chord. The designations on the cards thus are based on chord structure rather than specific name or functional structure, whereby the various cards show note relationships corresponding to chords such as the tonic, tonic sixth, dominant seventh, major seventh, minor sixth, minor seventh, augmented, diminished, as well as roots, inversions, etc.

The instruction adapter is employed to set a keyboard adapter to a given chord, by selecting the proper card for the desired chord and inserting it into the instruction adapter, longitudinally moving the card until the desired melody note indicated by the mark 16a appears in the window 15. The remaining indicia marks 16b, 16c and 16d will then designate on the keyboard, the notes of the desired chord.

Following setting of the instruction adapter, the first keyboard adapter 3 in the book may be similarly set by taking markers 4 and inserting them in the adapter 3 to designate the same keys as indicated on the instruction adapter 5. In like manner, successive chords are set from the corresponding card after the latter has been inserted in the instruction adapter and the desired notes designated thereon.

As illustrated in FIG. 4, the markers 4 may be angularly positioned to extend parallel with and overlying the key designated thereby, and enabling the user to readily identify and select the proper chord on a piano keyboard. To facilitate identification of the desired octave, the keyboard representations may be provided with an identifying mark 21 on middle C.

In the particular embodiment of the invention illustrated, it is possible to insert the card 12 directly into the keyboard adapter, following which the markers may be set therefrom but as only one card is provided for each chord formation it would be necessary to withdraw the card with a possibility of disarrangement of the designating markers. In most cases it will be found to be much simpler to adjust the instruction adapter by means of the card and thereafter set the markers 4 in the associated keyboard adapter by reference to the instruction adapter.

If desired, the melody note may be indicated by a marker 4 of different color, as for example, a blue or green marker, whereby the melody note will readily stand out from the notes of the chord.

It will be appreciated that as the "Tonalinqua" system involves the designation of chords in terms of note interval or, in other words, internal structure, the intervals being identified by vocal sounds corresponding to words, each chord may be readily identified orally and may be similarly correlated with any particular note on the piano keyboard, so that by means of a numeral and a word made up of vowels and consonants, corresponding to note intervals, the resulting word will always designate a chord having identical internal structure.

The invention is of particular use, not only in connection with "Tonalinqua," but also in terms of standard letter notation which may be readily achieved by employing suitable means for identifying the piano key with the letter notation, as for example, by marking the same on the adapters or, as illustrated in FIG. 6, by detachable letter notation strips 22 which may be mounted on each adapter to identify the keys thereon, such strip if desired being provided with a suitable adhesive whereby the strip may be applied and adhesively retained on the adapter but when desired may be readily stripped therefrom. In addition thereto, a conversion chart may be employed which would translate the melody notes of a song into letter equivalents as well as the chords indicated by the guitar chord symbols and with the aid of these devices it would be possible for anyone who cannot read notes to obtain the harmonies for songs provided with the guitar chord symbols. The markers on each adapter may thereby be positioned accordingly and the adapter book used as a guide in the proper selection of the chords to be played. Likewise, where desired the cards 12, as illustrated in FIG. 3, may contain standard notations 16' suitably located for display in a window such as the window 15.

It will be appreciated that while the invention is particularly applicable to the indication and arranging of chords and the like, it is equally applicable to the indication of scales and arpeggios. In such case the card 12, as illustrated in FIG. 6, would indicate the particular scale and in the case of arpeggios the individual adapters in the adapter book would be set accordingly.

Such cards 12 would have suitable indicia thereon arranged to appear in the window 15 to indicate the tone on which the scale or arpeggio is constructed.

It will be appreciated from the above description that the invention enables a non-musician to achieve some advancement and satisfaction in the utilization of harmonic structure without the requirement of extensive musical study and thus enables such person to achieve some degree of harmonic expression. In conjunction with "Tonalingua" the invention makes it possible for the non-musician to achieve substantial grasp of harmonic substance and by making the domain of harmony more accessible, hastens the acquisition of finger feel or the ability to play harmony by ear.

In the case of the non-professional musician having some degree of musical education, it provides a concrete medium for experimenting with chords, in effect providing the music hobbyist with the tool by means of which he may to a considerable measure explore the field of harmony to an extent that would be impossible in the absence of a highly advanced musical education and experience in the field of harmony and transposition, etc. In other words, "Tonalingua" notation enables the chord structures to be grasped in terms of entities having tone intervals without requiring that it be first analyzed in functional terms. Traditional notation, on the other hand, makes it impossible for a student to play chords without first having understood them in terms of functional structure. The present invention taken in conjunction with "Tonalingua" enables the student to readily grasp and identify chords in terms of the structural intervals involved in the chord, eliminating the confusion of sharps, flats, augmented or diminished chords, inversions, etc.

It will be appreciated from the above that I have provided a relatively very simple yet highly efficient structure and system by means of which chord structures may be reduced to basic terms, enabling the non-musician and elementary student to readily achieve an understanding and usage of harmonic combinations which otherwise are buried behind a maze of functional structure and designation.

The invention is capable of a wide variety of physical structures by means of which the desired results may be achieved, the chord adapters if desired being constructed integrally with the page or leaves of the adapter book, as for example, by employing a laminated leaf structure. Likewise the adapter leaves may be constructed to receive only individual identifying markers such as the markers 4, the cards 12 being employed merely in conjunction with the instruction or master adapter.

Having thus described my invention, it will be obvious to those skilled in the are from the disclosure herein given that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a display structure for indicating chord relationships, the combination of a body member having the representation of a piano keyboard thereon, an indicating member cooperable with said body member to designate a plurality of desired notes on such keyboard in a predetermined chord relation, and cooperating means on said body and indicating members for visibly presenting a melody note, said plurality of chord notes being displayed in predetermined relation with respect to the melody note to designate the keys representing the notes formnig the particular chord for the designated melody note, movement of said indicating member relative to said body member being operable to designate any melody note and the corresponding keys of the predetermined chord combination for such note.

2. A display structure as defined in claim 1, wherein said body member is cooperable with any one of a plurality of indicating members, each of which represents a different chord combination for a single melody note.

3. A display structure as defined in claim 1, wherein said body member is provided with means for guiding said indicating member for movement relative thereto, whereby said indicating member may be disposed to present a chord of predetermined internal relationship between the component notes thereof, for any selected melody note on said body member within the range of the indicia appearing on the latter.

4. A display structure as defined in claim 3, wherein a plurality of indicating members are provided, each displaying chords having different internal relationships between the component notes thereof and the melody note indicated thereby.

5. A display structure as defined in claim 3, wherein said body member is provided with an opening therein extending the length of the series of musical notes represented thereon, through which the indicating member is visible, the latter having indicia therein adapted to be aligned with notes on said body member to indicate a selected melody note and the notes of a chord having internal relationsip as designated by said indicating member.

6. A display structure as defined in claim 3, wherein the cooperable informative means on the body and indicating member comprises a second opening in said body member through which said information is visible.

7. A display structure as defined in claim 6, wherein said information comprises indicia identifying the selected melody notes.

8. In a display structure for indicating note relationships, the combination of a body member having the representation of a chromatic series of musical notes thereon, an indicating member cooperable with said body structure to designate a plurality of desired notes thereon in predetermined relation, and means constructed to be supported on said body member in association with said representation for indicating the designated notes independently of said indicating member.

9. In a display structure for indicating relationships between a plurality of notes, the combination of a body member having the representation of a chromatic series of musical notes thereon, a plurality of individual note indicating members constructed to be superimposed upon said representation to indicate individual musical notes thereon, and a note designating member movable relative to said body member and having indicia cooperable with said representation for designating notes thereon at which one of said note indicating members is to be supported.

10. In a device for displaying chord relationships in a musical composition, the combination of a plurality of representations of a chromatic series of musical notes, each representation being adapted to display a selected chord of a melody with said chords arranged in melodic sequence, a plurality of members constructed to be associated with the respective representations, each member being operable to designate a respective note of a selected chord, a master individual chord dislaying member comprising a body member having a master representation thereon corresponding to each of said first mentioned representations, a master chord designating member cooperable with said body member to designate on said master representation all of the notes of a selected chord, thereby forming a visible guide illustrating the proper locations at which said individual note designating members are to be disposed on a representation to present thereon the selected chord.

11. In a device for displaying chord relationships in a musical composition, the combination of a plurality of leaves, each having thereon a plurality of representations of a chromatic series of musical notes, each representation being adapted to display a selected chord of a melody with said chords arranged in melodic sequence, and independently movable means, for each note, associated with each representation for designating the notes of the chord to be displayed.

12. A display device as defined in claim 11, wherein said leaves are provided with an area adjacent each representation for the receipt of information relative to the associated displayed material.

13. A display device as defined in claim 12, wherein said areas of the leaves are constructed to receive manually written and erasable material.

14. A display device as defined in claim 13, wherein said areas of the leaves are constructed to receive erasable chalk indicia.

15. A display device as defined in claim 11, wherein said movable means comprises a plurality of indicating members for each representation, each indicating member being constructed to designate a single note of the associated representation, said leaves being constructed to adjustably receive and support the respective indicating members in desired relation with respect to the associated representation.

16. A display device as defined in claim 11, wherein said movable means comprises a plurality of indicating members for each representation, at least some of said indicating members being constructed to designate a plurality of notes of the associated representation, said leaves being constructed to adjustably receive and support the respective indicating members in desired relation with respect to the associated representation.

17. In a display device as defined in claim 11, wherein said movable means comprises an indicating member for each representation, each indicating member being constructed to designate a plurality of notes of the associated representation which constitute all of the notes of a selected chord, said leaves being constructed to adjustably receive and support the respective indicating members in desired relation with respect to the associated representation.

18. A display device as defined in claim 17, wherein said indicating members are in the form of cards slidably carried by the associated leaves.

19. A display device as defined in claim 11, wherein said leaves each comprise a plurality of plies of sheet material, at least one of the outer plies carrying said representations and having an opening therein adjacent each representation for the reception of said indicating means, whereby the latter are each retained in adjusted position.

20. A display device as defined in claim 19, wherein said leaves and indicating members are provided with cooperable means for producing magnetic attracting forces therebetween operative to offer resistance to separating movements between the leaves and associated indicating members.

21. As an article of manufacture, chord indicating members having indicia thereon constructed for cooperation with means having the representation of a chromatic series of notes thereon, said member having indicia designating a melody note and indicia designating a chord to be associated with the melody note, said member having a predetermined combination of tone intervals between the indicia designating the melody note and the indicia designating the respective notes of the chord to be associated therewith.

22. As an article of manufacture, a chord designating member having indicia thereon constructed for cooperation with means having the representation of a chromatic series of notes thereon, said member having indicia thereon disposed to identify a melody note and the notes of a selected chord therefor on such a representation.

23. An article of manfacture, as defined in claim 22, wherein said member also is provided with indicia thereon identifying the chord involved.

24. An article of manufacture, as defined in claim 22, wherein said member is also provided with indicia thereon designating a melody note with which such chord may be associated.

25. An article of manufacture, as defined in claim 24, wherein said member is provided with chord identifying indicia adapted to cooperate with such means and correlated to identify the chord involved for differently designated melody notes on such a representation.

26. As an article of manufacture, a series of chord designating members, each of which has indicia thereon constructed for cooperation with means having the representation of a chromatic series of notes thereon, said members each having indicia designating a melody note and indicia designating a chord to be associated with the melody note, each member having a different combination of tone intervals between the indicia designating the melody note and the indicia designating the respective notes of the chord to be associated therewith.

27. An article of manufacture as defined in claim 28, wherein each of said members is provided with indicia for identifying a selected melody note on such a representation.

28. An article of manufacture as defined in claim 27, wherein said member is provide with additional indicia designating the character of the chord involved.

References Cited by the Examiner

UNITED STATES PATENTS

| | | | |
|---|---|---|---|
| 946,291 | 1/10 | Turner | 84—481 |
| 1,053,366 | 2/13 | Dickson | 84—483 |
| 2,497,364 | 2/50 | Mayberry | 84—473 |
| 2,687,060 | 8/54 | Scheb | 84—482 |
| 2,718,169 | 9/55 | Barnes | 84—480 |
| 2,864,275 | 12/58 | Fraleigh | 84—471 |

FOREIGN PATENTS

| | | |
|---|---|---|
| 418,923 | 10/10 | France. |
| 950,607 | 3/49 | France. |
| 539,044 | 11/31 | Germany. |
| 136,874 | 12/19 | Great Britain. |

LEO SMILOW, *Primary Examiner.*